G. T. SEGEE.
NUT LOCK.
APPLICATION FILED APR. 12, 1915.

1,153,347.

Patented Sept. 14, 1915.

WITNESSES:
Edward A. Breed,
Harry C. Daggett.

INVENTOR,
Gerard T. Segee,
BY Allen & Daggett
ATTORNEYS.

UNITED STATES PATENT OFFICE.

GERARD T. SEGEE, OF REVERE, MASSACHUSETTS.

NUT-LOCK.

1,153,347.  Specification of Letters Patent.  Patented Sept. 14, 1915.

Application filed April 12, 1915.  Serial No. 20,603.

*To all whom it may concern:*

Be it known that I, GERARD T. SEGEE, a citizen of the United States, residing at Revere, in the county of Suffolk, in the State of Massachusetts, have invented a certain new and useful Improvement in Nut-Locks, of which the following is a specification, reference being had to the accompanying drawings.

The immediate object of this invention is to provide an exceedingly simple and cheap device for locking nuts against jarring loose after said nuts have been screwed home the construction being, however, such that the nut may be set up tighter, if necessary without disarranging or destroying the lock.

Figure 1:
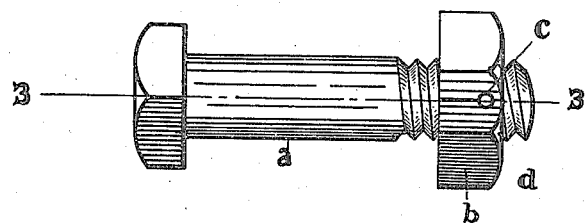
Figure 2:
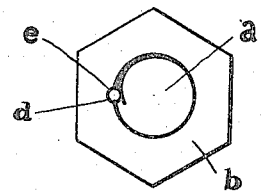
Figure 3:
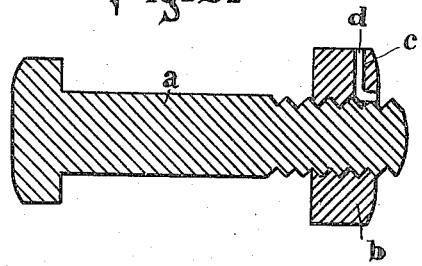
Figure 4:

My said invention is clearly illustrated in the annexed drawings, Figure 1 being a side view of an assembled bolt and nut embodying my present improvement and Fig. 2 is an end view of the same. Fig. 3 is a central longitudinal sectional view of the bolt and nut of Fig. 1 taken on the line 3—3 of said figure. Fig. 4 is a detached, side, view of the locking wire $d$.

Referring to these drawings, the letter $a$ indicates a bolt of ordinary construction and $b$ denotes a nut of ordinary construction excepting that it is provided with one or more radial holes $c$ leading outward from the threaded opening in the nut, the holes $c$ being provided for the reception of angle wires $d$ which constitute the novel locking feature of my present invention.

When about to assemble the bolt and nut one arm of the angle wire $d$, which is, preferably, of relatively softer metal than the nut, is inserted in the hole $c$ from the inside of the nut, leaving the other arm of said wire parallel with the axis of the bolt. The nut is also formed with a notch $e$ which is also parallel with the axis of the bolt and serves as a pocket for the reception of the other arm of the wire $d$; the depth of the notch being about equal to one half of the diameter of said wire. The wire is thus held against displacement during the operation of screwing the nut home on the bolt, and the locking wire $d$ is so inclosed and concealed that it cannot be removed, or tampered with, without first unscrewing the nut.

The nut may be easily screwed upon the bolt until said bolt engages the wire $d$, when the thread of the bolt cuts into and jams the relatively softer wire $d$ and the said wire then serves as a wedge to prevent the accidental unscrewing, or jarring loose, of the nut. It does not, however, prevent the nut from being screwed farther onto the bolt, or from being unscrewed and removed from the bolt, provided that the same degree of force is used that was required to screw the nut home in the first instance.

The wire $d$ may be readily formed, and cut to desired length, by automatic machinery at practically no cost, and the holes $c$ may be punched or drilled in the nuts at a very small cost.

Having thus described my invention, I claim as new and wish to secure by Letters Patent:—

In combination with a threaded bolt, a coöperating threaded nut having a plurality of its threads channeled transversely and having a radial opening, a locking key of angular form adapted to be inserted in the said opening from the inside of the nut; one arm of said key being located in said channel and the other arm of the key being located within the said radial opening.

GERARD T. SEGEE.

Copies of this patent may be obtained for five cents each, by addressing the "Commissioner of Patents, Washington, D. C."